(12) United States Patent
Cullen

(10) Patent No.: US 12,458,312 B1
(45) Date of Patent: Nov. 4, 2025

(54) MULTI-CONFIGURABLE DENTAL RADIOGRAPH SENSOR HOLDER SYSTEM

(71) Applicant: Shayda Cullen, Holden, MA (US)

(72) Inventor: Shayda Cullen, Holden, MA (US)

( * ) Notice: Subject to any disclaimer, the term of this patent is extended or adjusted under 35 U.S.C. 154(b) by 0 days.

(21) Appl. No.: 19/016,757

(22) Filed: Jan. 10, 2025

(51) Int. Cl.
*A61B 6/51* (2024.01)
*G03B 42/04* (2021.01)

(52) U.S. Cl.
CPC ............ *A61B 6/512* (2024.01); *G03B 42/042* (2013.01)

(58) Field of Classification Search
CPC .......... A61B 6/512; A61B 6/51; G03B 42/042
See application file for complete search history.

(56) References Cited

U.S. PATENT DOCUMENTS

| | | | |
|---|---|---|---|
| 5,737,388 A * | 4/1998 | Kossila | A61B 6/512 378/170 |
| 7,959,355 B2 | 6/2011 | Stantchev | |
| 8,320,525 B2 | 11/2012 | Khouri | |
| 11,134,903 B2 | 10/2021 | Cullen | |
| 11,224,387 B2 | 1/2022 | Cullen | |
| 2016/0324491 A1 | 11/2016 | Kim | |
| 2016/0361037 A1 | 12/2016 | Im et al. | |
| 2018/0064405 A1 | 3/2018 | Miller | |
| 2021/0307706 A1* | 10/2021 | Cullen | A61B 6/512 |

OTHER PUBLICATIONS

Choi, KR 10-2012-0082704 A and its English translation (Year: 2012).*

* cited by examiner

*Primary Examiner* — Chih-Cheng Kao
(74) *Attorney, Agent, or Firm* — The Concept Law Group, PA; Scott D. Smiley; Scott M. Garrett

(57) ABSTRACT

A multi-configurable dental radiograph sensor holder system includes a handle having a long portion and a short portion at right angle to each other. An aiming ring is coupled to the long portion and a sensor holder is coupled to the short portion by a sensor positioning ring that is coupled to the short portion of the handle through a hinge linkage. The hinge linkage is articulable in the plane of the aiming ring and allows the sensor to be moved into different positions relative to the aiming ring in order to collect anterior, posterior, and bite wing views of a patient's dentition.

14 Claims, 18 Drawing Sheets

ANTERIOR

ANTERIOR

BITEWING

POSTERIOR

MULTI-CONFIGURABLE DENTAL RADIOGRAPH SENSOR HOLDER SYSTEM

FIELD OF THE INVENTION

The present invention relates generally to dental radiograph sensor holder system, and, more particularly, relates to a multi-configurable dental radiograph sensor holder system that can be reconfigured for the various views taken for dental radiography.

BACKGROUND OF THE INVENTION

Dental radiography is used to allow dentists and other professionals see the condition of teeth, bones, and tissue in the mouths of patients. This allows, for example, dentists to identify cavities, pre-existing dental work, the state of bone supporting the teeth, and so on. Taking radiographs of teeth is often an unpleasant experience for the patient, and involves a system of rods, holders, and rings to position the film or sensor in the patient's mouth at the proper orientation to capture the desired view. Typically, a set of radiographs includes anterior views, posterior views, and bitewing views. Upper and lower views are commonly taken for each of these categories. For each view, the dental professional must select the appropriate arm, hanger coupling to couple the arm to the aiming ring, and sensor holder, then assemble these together, and place the film/sensor in the patient's mouth at the correct orientation, then aim the beam source at the film/sensor. Since, in a conventional sensor holder system there can be three different arms or handles, multiple sensor holders, and multiple hanger couplings, producing a set of radiograph views can take some time as the dental professional has to re-select, and then re-assemble components for each view. Furthermore, all of these attachments must be sterilized before being used with the next patient. This is not desirable for either the dental professional or the patient.

Therefore, a need exists to overcome the problems with the prior art as discussed above.

SUMMARY OF THE INVENTION

In accordance with some embodiments of the inventive disclosure, there is a provided a multi-configurable dental radiograph sensor holder system that includes a handle having a long portion and a short portion. There is an aiming ring mounted to the long portion of the handle and which defines an aiming ring plane. There is a hinge linkage coupled to the short portion of the handle which is articulable in a hinge plane that is parallel to the aiming ring plane.

In accordance with a further feature, there is also a positioning ring coupled to the hinge linkage, and a sensor holder that is rotatably coupled to the positioning ring. The sensor holder is rotatable about its coupling with the positioning ring in a plane that is parallel to the aiming ring plane.

In accordance with a further feature, the positioning ring includes a circular opening, and the sensor holder includes a cylindrical portion sized to fit into the circular opening of the positioning ring.

In accordance with a further feature, there is also a convex detent feature provide on an inner wall of a circular body of the positioning ring through which the circular opening passes such that the convex detent feature extends into the circular opening. The cylindrical portion of the sensor holder includes three concave detent features on a sidewall of the cylindrical portion. When the sensor holder is rotated to a position where the convex detent feature meets one of the concave detent features, a mechanical interference between the convex detent feature and the concave detent feature creates resistance to rotation of the sensor holder.

In accordance with a further feature, the hinge linkage includes an intermediate portion that is hingeably coupled to the short portion of the handle.

In accordance with a further feature, there is also a first hinge pin disposed between a distal end of the short portion of the handle and a first end of the intermediate portion. Both the distal end of the short portion of the handle and the first end of the intermediate portion are clasped to the first hinge pin.

In accordance with a further feature, there is also a positioning ring having a radial extension. The radial extension has a distal end, and there is a second hinge pin disposed between the distal end of the radial extension of the positioning ring and a second end of the intermediate portion that is opposite the first end of the intermediate portion. Both the second end of the intermediate portion and the distal end of the radial extension are clasped to the second hinge pin.

In accordance with a further feature, the hinge linkage is articulable between an anterior view configuration, a posterior view configuration, and a bite wing view configuration.

In accordance with some embodiments of the inventive disclosure, there is a provided a multi-configurable dental radiograph sensor holder system that includes a handle having a long portion and a short portion. There is also an aiming ring mounted to the long portion of the handle and which defines an aiming ring plane. There is a hinge linkage coupled, at a first hinge point, to the short portion of the handle. There is a positioning ring coupled to the hinge linkage at a second hinge point. There is a sensor holder rotatably coupled to the positioning ring. The sensor holder is rotatable about its coupling with the positioning ring in a plane that is parallel to the aiming ring plane. The sensor holder, positioning ring, and the hinge linkage can be configured into an anterior view configuration, a posterior view configuration, and a bite wing view configuration without removing the sensor holder or positioning ring.

In accordance with a further feature, the hinge linkage is restricted to articulation in a plane that is parallel to the aiming ring plane.

In accordance with a further feature, rotation of the sensor holder is restricted to rotation in a plane that is parallel to the aiming ring plane.

In accordance with a further feature, in the aiming ring includes an arcuate slot, and wherein the aiming ring is mounted to the long portion of the handle by a coupler that fits into the arcuate slot, and wherein a position of the aiming ring can be adjust by rotating the aiming ring such that the coupler move to a selected position along the arcuate slot.

In accordance with a further feature, the positioning ring includes a circular opening, and the sensor holder includes a cylindrical portion sized to fit into the circular opening of the positioning ring.

In accordance with a further feature, there is also a convex detent feature provide on an inner wall of a circular body of the positioning ring through which the circular opening passes such that the convex detent feature extends into the circular opening. The cylindrical portion of the sensor holder includes three concave detent features on a sidewall of the cylindrical portion. When the sensor holder is rotated to a position where the convex detent feature meets one of the concave detent features, a mechanical interference between the convex detent feature and the concave detent feature creates resistance to rotation of the sensor holder.

In accordance with a further feature, there is an intermediate portion that is hingeably coupled to the short portion of the handle.

In accordance with a further feature, there is also a first hinge pin disposed between a distal end of the short portion of the handle and a first end of the intermediate portion, wherein both the distal end of the short portion of the handle and the first end of the intermediate portion are clasped to the first hinge pin.

In accordance with a further feature, there is also a positioning ring having a radial extension. The radial extension has a distal end. There is a second hinge pin disposed between the distal end of the radial extension of the positioning ring and a second end of the intermediate portion that is opposite the first end of the intermediate portion. Both the second end of the intermediate portion and the distal end of the radial extension are clasped to the second hinge pin.

In accordance with a further feature, the hinge linkage is articulable between an anterior view configuration, a posterior view configuration, and a bite wing view configuration.

Although the invention is illustrated and described herein as embodied in a multi-configurable dental radiograph sensor holder system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down," "left," "right," "inside," "outside," "front," "back," "head," "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first," "second," "third," and so on are only used for descriptive purposes and cannot be construed as indicating or implying relative importance.

In the description of the embodiments of the present invention, it should be noted that, unless otherwise clearly defined and limited, terms such as "installed," "coupled," "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure. In this document, the term "longitudinal" should be understood to mean in a direction corresponding to an elongated direction of the article or structure being referenced. Those skilled in the art can understand the specific meanings of the above-mentioned terms in the embodiments of the present invention according to the specific circumstances.

The phrase "extends from" indicates a structural relationship between two or more portions of an article. For example, if A extends from B, that means, first, that A and B are connected or joined to each other, and that A includes an end, side, point, surface, or other terminus, that is remote from B, and the major portion of A is between that terminus and the interface where A and B meet. The terminus may be free, or it may be connected to yet another structural element. For example, if A extends from B to C, or said differently, A extends between B and C, it means that B and C are remote from each other, and A connects to both B and C.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
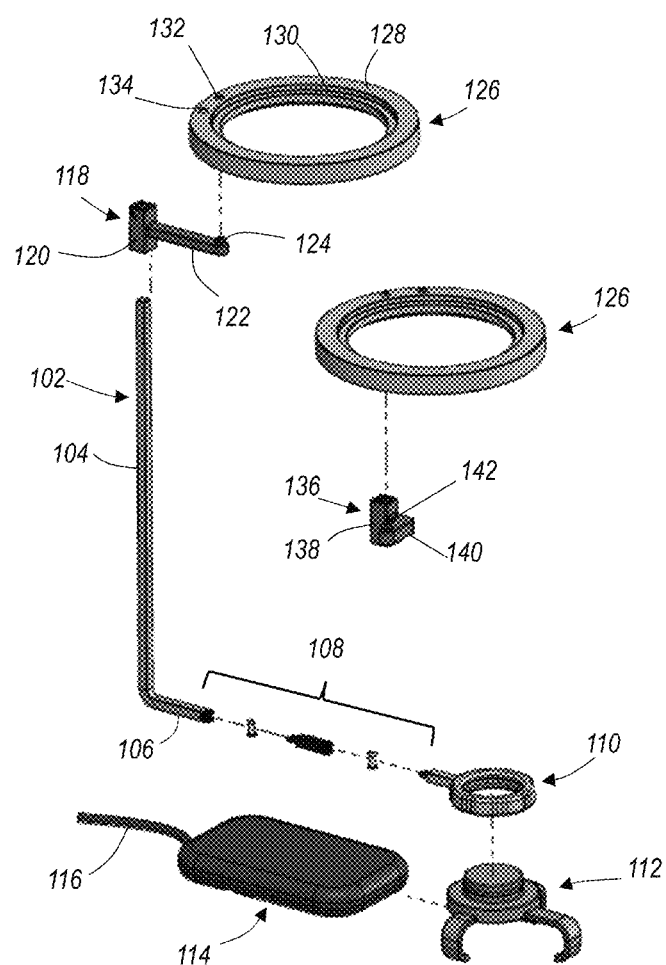
FIG. 1A is a first exploded view of a multi-configurable dental radiograph sensor holder system, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient multi-configurable dental radiograph sensor holder system that allows reconfiguration of the system without having to disassemble and use different components to provide for different orientations of the sensor for the various dental views. in the following drawings, the inventive multi-configurable dental radiograph sensor holder system is shown in various exploded and assembled views, as well as detail views. Reference numerals are carried forward throughout the drawings to refer to the same structure across the drawings, and reference should be made to the multiple drawings through the following description.

Figure 1B:
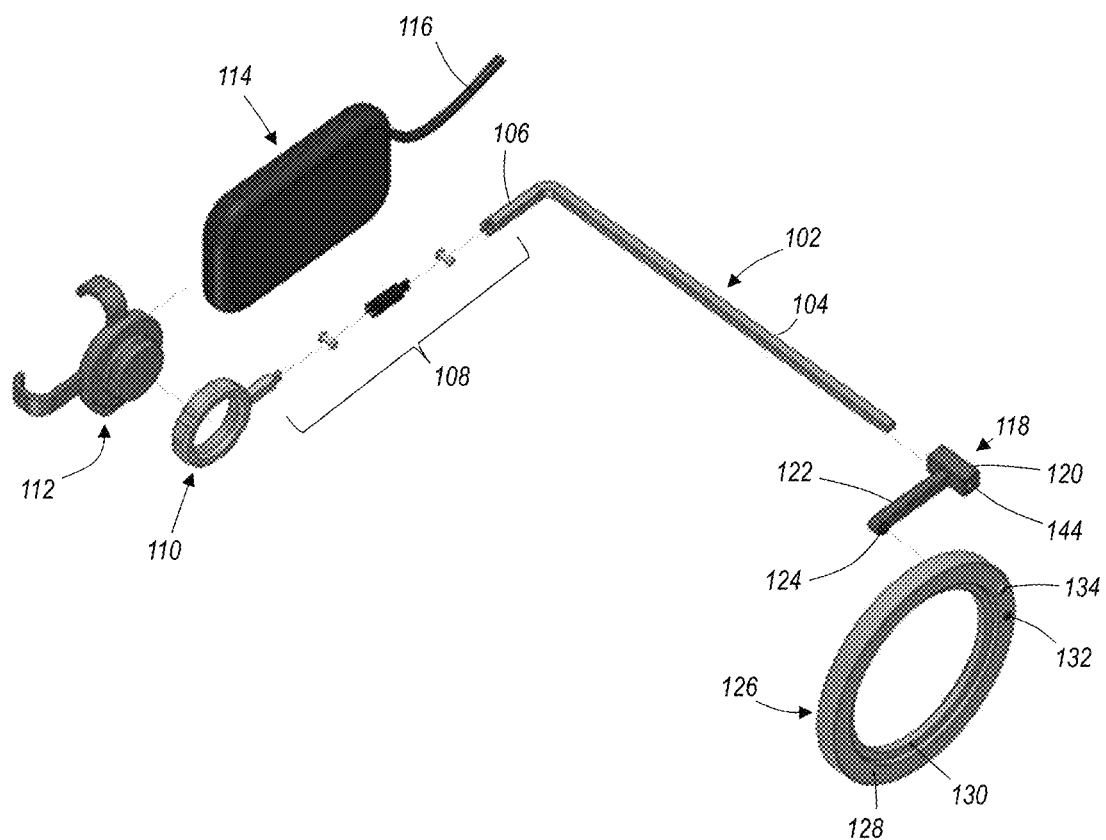
FIG. 1B is a second exploded view of a multi-configurable dental radiograph sensor holder system, in accordance with some embodiments.

FIG. 1A is a first exploded view of a multi-configurable dental radiograph sensor holder system 100, in accordance with some embodiments. Similarly, FIG. 1B is a second exploded view of a multi-configurable dental radiograph sensor holder system. A handle 102 is formed by a square rod having a long portion 104 and a short portion 106. The long portion is generally oriented perpendicular to the plane of the sensor 114, and in the general direction of the beam emission that is emitted at the sensor 114. The short portion 106 is at a right angle to the long portion 106 and they meet at respective ends. The handle 102 is coupled to an aiming ring 126 by a hanger coupling 118 for bitewing views or hanger coupling 136 for anterior and posterior views. The hanger coupling 118, 136 includes body portion 120, 138, respectively, having a square bore 144 through it to allow the body portion 120, 138 to fit onto the long portion 104 of the handle 102, and move along the long portion 104 as needed. Each of the handle couplings 118, 136 have an extension arm 122, 140, respectively, that couples to the aiming ring 126 at either of several coupling location 132, 134. Specifically, hanger coupling 118 is used and couples to coupling location 132 for bitewing views, and hanger coupling 136 is used and coupled to coupling location 134 for anterior and posterior views. A coupling peg 124, 142, respectively, fit into the coupling locations 132, 134, which are openings through the body 128 of the aiming ring 126. The aiming ring 126 also includes an alignment ledge 130 which is a recessed relative to the body 128 to receive the distal end cylindrical beam source barrel, as is well known.

To couple the sensor 114 to the system in the correct alignment, a sensor holder 112 is provided that is rotatably coupled to a sensor positioning ring 110 which is coupled to the short leg 106 of the handle 102 through a hinge linkage 108. The sensor 114 is rectangular with rounded corners so as not to poke into the tissue in a patient's mouth, and fits into an arrangement of three hook arms 182a, 182b, 184 (see FIG. 1D) which fit tightly against the outside of the sensor 114. By making the sensor holder 112 rotatable with respect to the sensor positioning ring 110 the sensor can be rotated when switching from viewing the left side of the patient's mouth to the right side, or front, as desired, allowing the sensor cable 116 a direct path out of the patient's mouth. The hinge linkage 108 allows the sensor positioning ring 110 to be positioned in any of several positions by articulating the linkage 108 into the desired configuration/position.

Figure 1C:
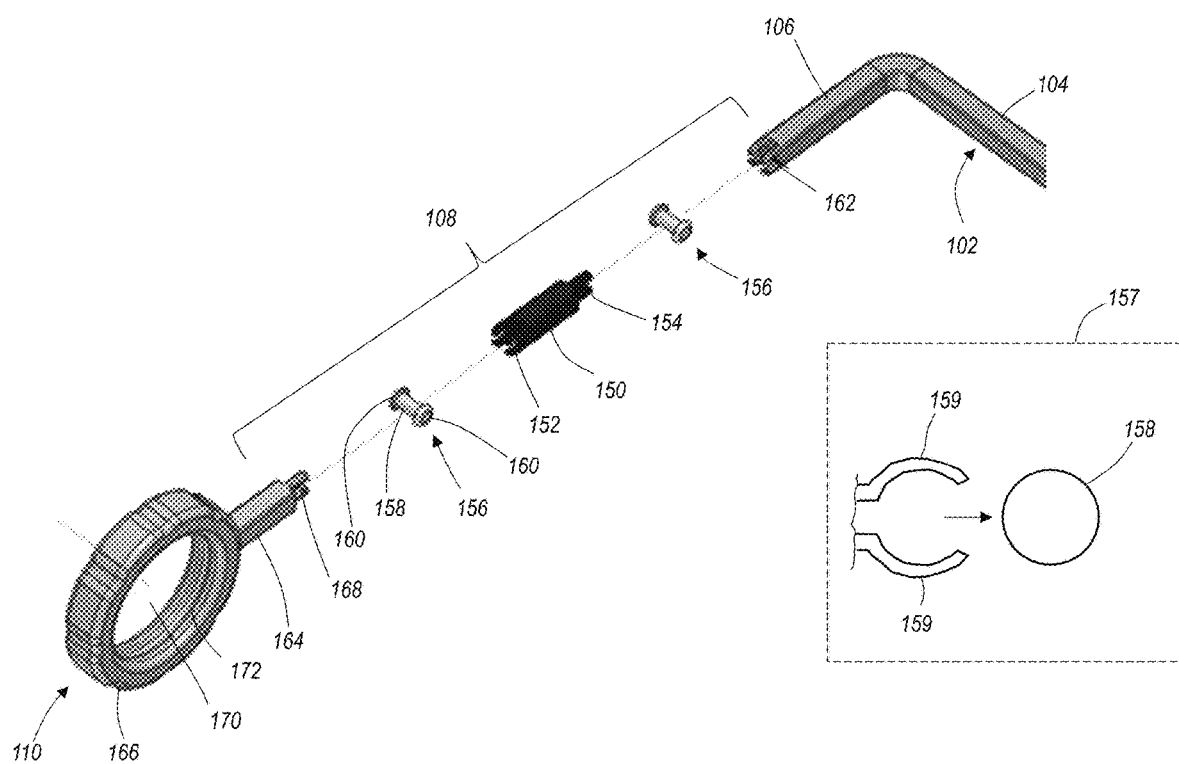
FIG. 1C is an exploded view detail of the configurable linkage of a multi-configurable dental radiograph sensor holder system, in accordance with some embodiments.

FIG. 1C is an exploded view detail of the configurable hinge linkage 108 of a multi-configurable dental radiograph sensor holder system, in accordance with some embodiments. The linkage 108 includes an intermediate portion 150 that in general has a similar cross section shape to that of the handle 102. It is an elongated article with a square cross section. At the opposite ends 152, 154 of the intermediate portion 150 are clasps that are configured to snap over the cylindrical body 158 of hinge pins 156. The hinge pins also have caps 160 at each end of the cylindrical body 158 that extend outward, relative to the cylindrical axis of the cylindrical body 158 to retain the hinge pins 156 in the linkage system. Similarly, at the distal end 162 of short portion 106 of the handle 102 there is a clasp, and there is a clasp at the distal end 168 of the radial extension 164 of the sensor positioning ring 110. These clasps have opposing retaining fingers that snap over the cylindrical body 158 of a hinge pin 156, and the clasps nest together on the hinge pins 156. For example, the clasp at the end 168 of the radial extension 164 has one pair of retaining fingers, while the clasp at then end 152 of the intermediate portion 150 has two pairs of retaining fingers; the single pair of retaining fingers at end 168 fit between the two pairs of retaining finger at end 152 over the cylindrical body 158 of the hinge pin 156. The snap fit is achieved by making the retaining fingers arcuate, with their ends separated by a distance less than the diameter of the cylindrical body 158. By pushing the retaining fingers over the cylindrical body 158, the ends of the retaining fingers are displaced apart until they are on the other side of the cylindrical body 158 where they are urged back together by the spring property of the material. Thus, there is a hinge pin 156 disposed between the distal end 162 of the short portion 106 and a first end 156 of the intermediate portion 150 which creates a first hinge point. A second hinge point is created by a second hinge pin 156 being disposed between the second end 152 of the intermediate portion 150 and the distal end 168 of the radial extension 164 of the positioning ring 110. Both of these hinge points restrict articulation to the same plane in order to be configured for the various views. Inset 157 show a side profile the cylindrical body 158 of a hinge pin 156, which retaining fingers 159 being moved over the cylindrical body 158. The hinge linkage 108 thus provides at least two hinge points, which are at the locations of the hinge pins, about which the hinge linkage can articulate. Both of these hinge points allow articulation in the same plane, i.e. in a plane parallel to the plane of the aiming ring when the aiming ring is properly attached to the handle 104.

Figure 1D:
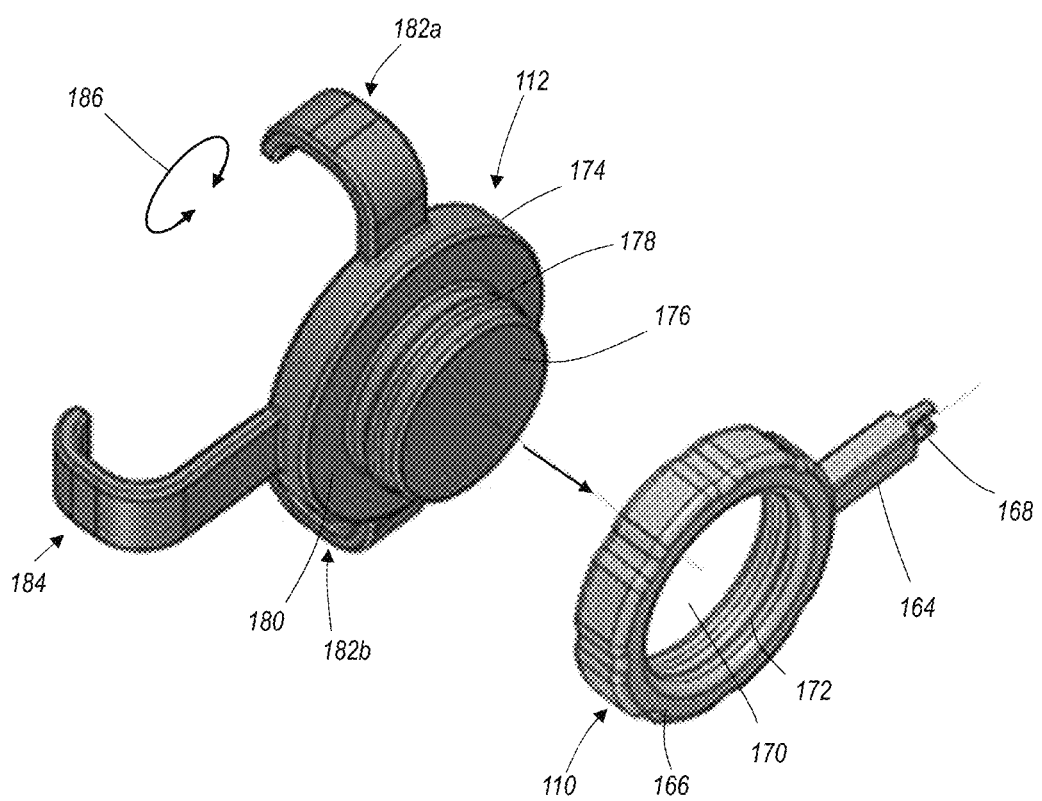
FIG. 1D is an exploded view detail of the rotatable sensor coupling of a multi-configurable dental radiograph sensor holder system, in accordance with some embodiments.

The sensor positioning ring 110 includes a ring body 166 that forms a circular opening 170 through the body 166. The radial extension 164 can extend along a radial line from the ring body 166. On the inner surface of the ring body 166 there can be annular ridge and grove retaining features 172 that capture, through interference, corresponding ridge feature(s) 178 on the outer surface of the cylindrical interface portion 176 of the sensor holder 112, as shown in FIG. 1D. The cylindrical portion 176 is a puck-shaped circular structure that extends from the main body 174 of the sensor holder 110. There is a shoulder 180 against which the body 166 of the sensor positioning ring 110 will be adjacent when the sensor holder 112 and the sensor positioning ring 110 are assembled together. This is done by pushing the cylindrical portion 176 into the opening 170 so that an annular ridge around the outer side surface of the cylindrical portion 176 is captured in an annular groove 172 around the inner surface of the body 166 of the sensor positioning ring 110. This allows the sensor holder 112 to rotate while coupled to the sensor positioning ring 110, as indicated by arrow 186. Opposing hook arms 182a and 182b hold the sensor 114 on opposing sides of the sensor 114, and end hook arm 184 provides both a stop and additional support for holding the sensor 114.

In general, to assembly the system 100, the dental professional selects either the bitewing handle coupling 118 or the anterior/posterior handle coupling 136 for bitewing views or anterior/posterior views, respectively. Then the body portion 120, 136 of the selected handle coupling 118, 136 is placed over the long portion 104 of the handle 102. The hinge linkage 108 can be pre-assembled with the sensor positioning ring 110. The sensor 114 an be placed into the sensor holder 112, which is snapped into the sensor positioning ring 110 as described above. The selected handle coupling 118, 136 is further coupled to the aiming ring 126. Then the hinge linkage can be adjusted to the desired position for the desired radiograph view. FIGS. 2A-2B, 3A-3B, and 4A-4B show various configurations of the system 100 for anterior, bitewing, and posterior views, respectively.

Figure 2A:
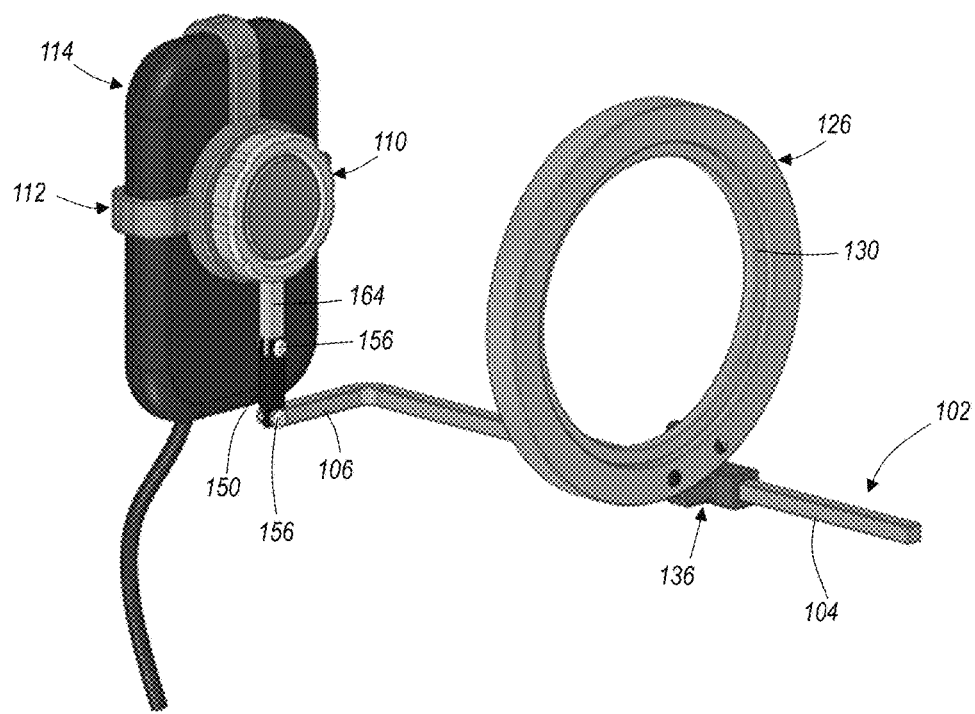
FIG. 2A shows a perspective view of a multi-configurable dental radiograph sensor holder system in an anterior view configuration, in accordance with some embodiments.
Figure 2B:
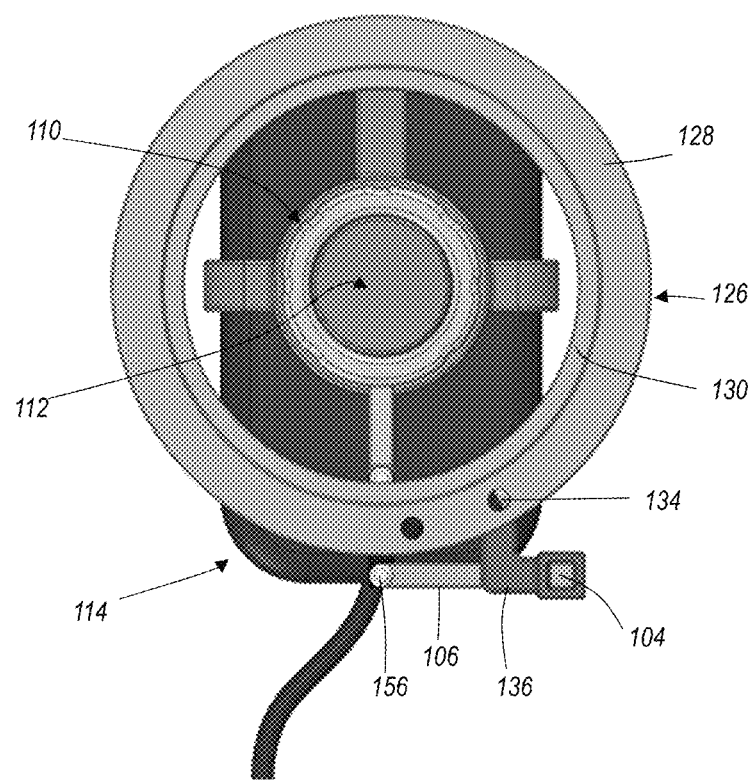
FIG. 2B shows an aiming view of a multi-configurable dental radiograph sensor holder system in an anterior view configuration, in accordance with some embodiments.

FIG. 2A shows a perspective view of a multi-configurable dental radiograph sensor holder system in an anterior view configuration, and FIG. 2B shows an aiming view of a multi-configurable dental radiograph sensor holder system in an anterior view configuration, in accordance with some embodiments. In this configuration, the intermediate portion 150 of the hinge linkage is oriented at right angle to the elongated direction of the short portion 106 of the handle 102, and is co-linear with the radial extension 164 of the sensor positioning holder. The sensor 114 is oriented/rotated so that its elongated direction is oriented vertically. To produce the view, the end of the emitter barrel is placed into the aiming ring 126 and briefly energized to emit a beam toward the sensor 114, which produces an image of the teeth that are between the sensor 114 and the aiming ring 126/emitter. The position of the aiming ring 126 can be adjusted along the handle 102 by sliding the handle coupling 136 to the desired position. As shown, the system 100 is configured to produce an image of the upper anterior teeth, and can be flipped over to produce and image of the mandibular anterior teeth. The coupling pin of the handle coupling 136 fits into coupling opening 134 so that the aiming ring 126 is centrally positioned with respect the sensor 110 in this configuration.

Figure 3A:
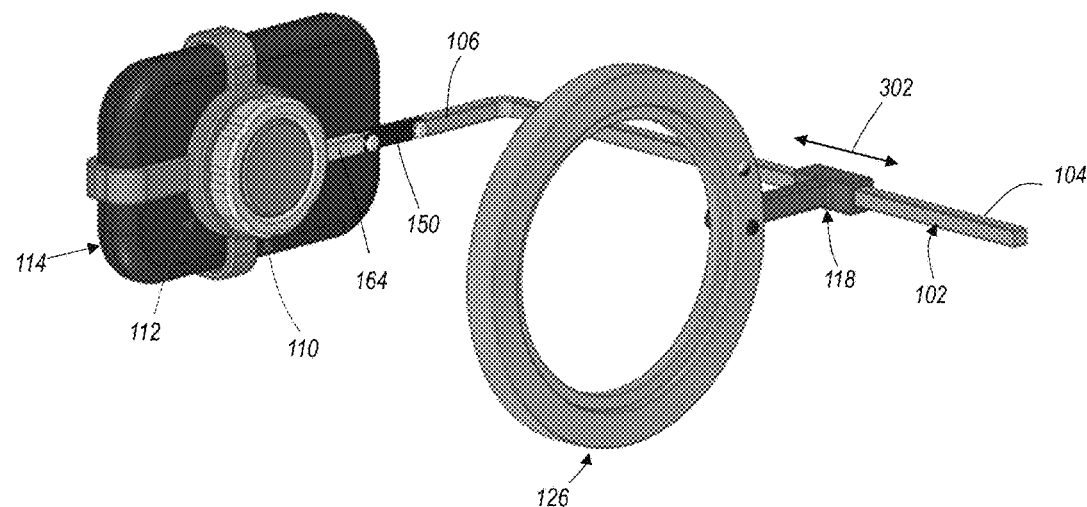
FIG. 3A shows a perspective view of a multi-configurable dental radiograph sensor holder system in a bitewing view configuration, in accordance with some embodiments.
Figure 3B:
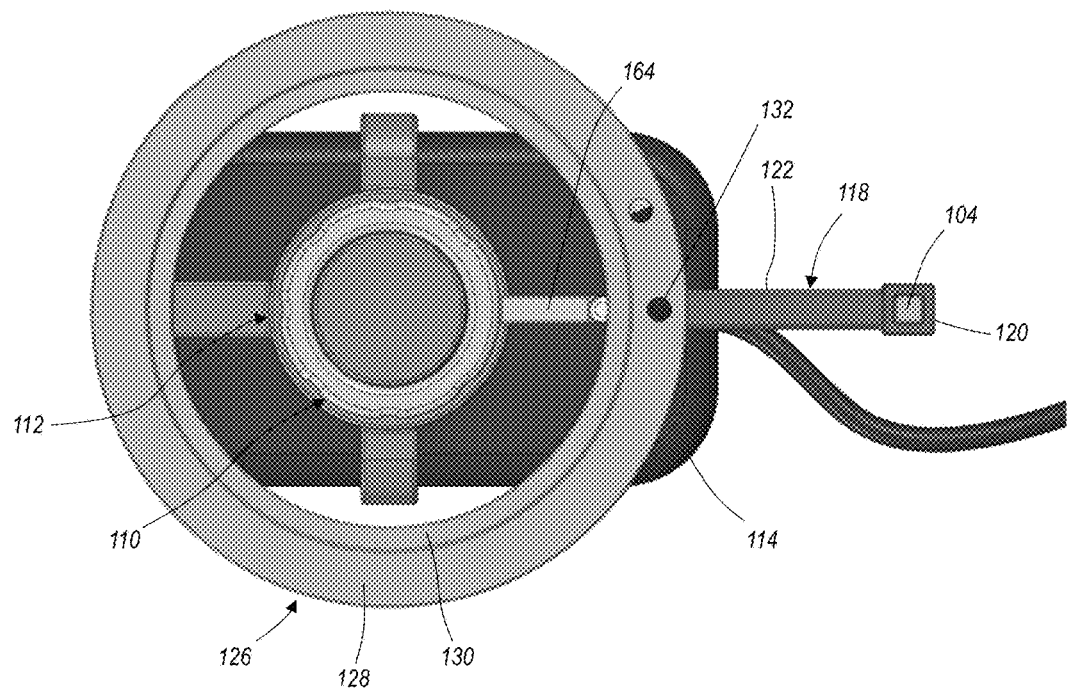
FIG. 3B shows an aiming view of a multi-configurable dental radiograph sensor holder system in a bitewing view configuration, in accordance with some embodiments.

FIG. 3A shows a perspective view of a multi-configurable dental radiograph sensor holder system in a bitewing view configuration, and FIG. 3B shows an aiming view of a multi-configurable dental radiograph sensor holder system in a bitewing view configuration, in accordance with some embodiments. In the bitewing view configuration, the hinge linkage is entirely co-linear; the short portion 106 of the handle 102, intermediate portion 150, and radial portion 164 are all aligned in line with each other. The sensor 114 is oriented/rotated so that the elongated direction of the sensor 114 is generally horizontal. The bitewing handle coupling 118 is used to couple the handle 102 to the aiming ring 126, and the coupling peg 124 is placed into coupling opening 132 to centrally align the aiming ring 126 with the sensor 114.

Figure 4A:
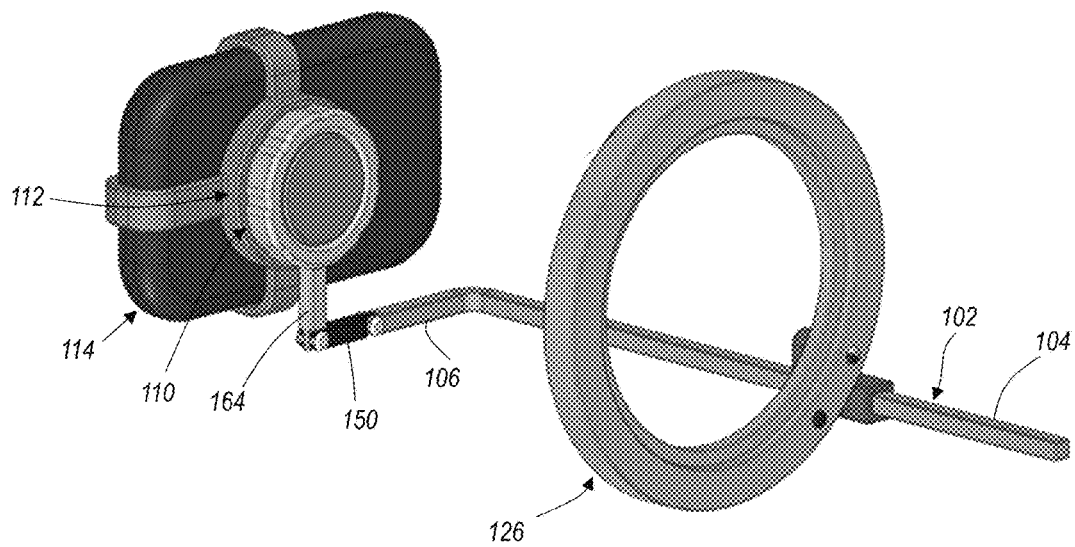
FIG. 4A shows a perspective view of a multi-configurable dental radiograph sensor holder system in a posterior view configuration, in accordance with some embodiments.
Figure 4B:
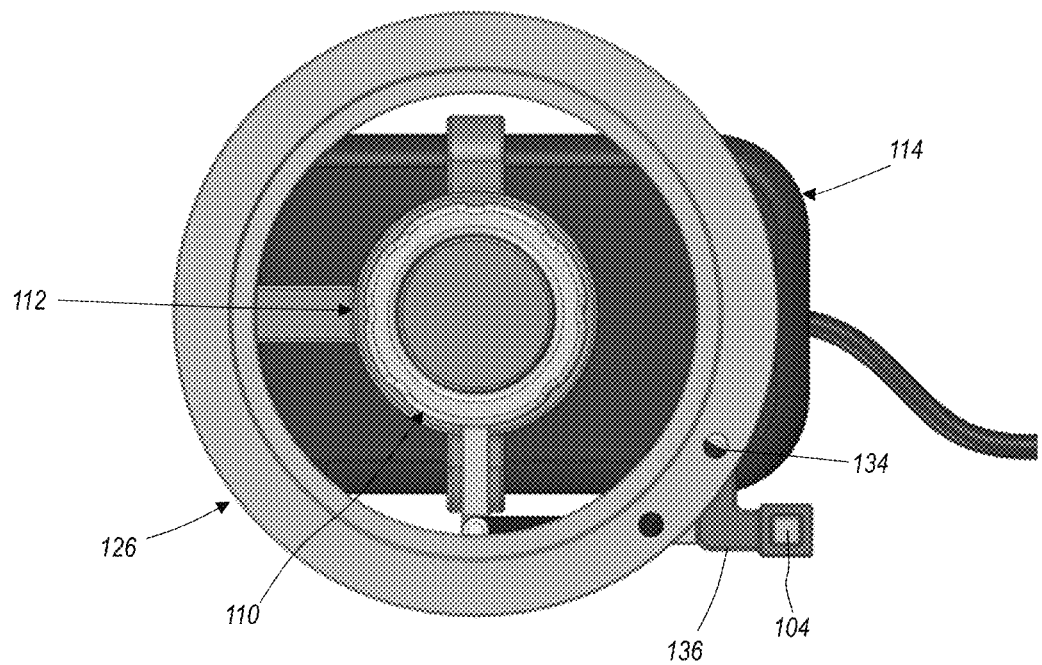
FIG. 4B shows an aiming view of a multi-configurable dental radiograph sensor holder system in a posterior view configuration, in accordance with some embodiments.

FIG. 4A shows a perspective view of a multi-configurable dental radiograph sensor holder system in a posterior view configuration, and FIG. 4B shows an aiming view of a multi-configurable dental radiograph sensor holder system in a posterior view configuration, in accordance with some embodiments. Again, here the handle coupling 136 is used, and coupled to coupling opening 134 in the aiming ring 126. The hinge linkage is configured by aligning the intermediate portion 150 to be co-linear with the short portion 106 of the handle 102. However, the radial extension 164 is turned at a right angle to the intermediate portion 150. The sensor 114 is oriented so that the elongated direction of the sensor 114 is generally horizontal.

In general, the aiming ring is circular in a plane that is perpendicular to the long portion of the handle. The hinge linkage is articulable within a plane that is parallel to the plane of the aiming ring, and the sensor holder is rotatable in a plane that is parallel to the plane of the aiming ring. The sensor holder also holds the sensor so that the sensor is oriented in a plane that is parallel to the plane of the aiming ring.

Figure 5A:
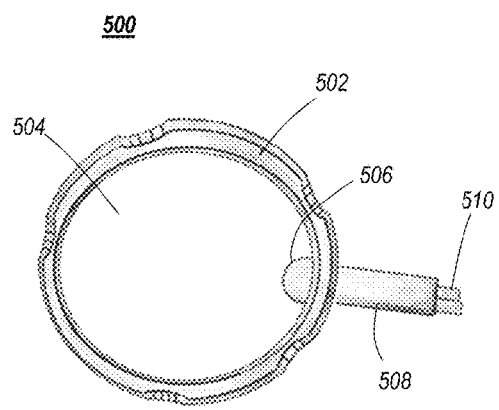
FIG. 5A shows a bottom view of a positioning ring having a detent feature, in accordance with some embodiments.
Figure 5B:
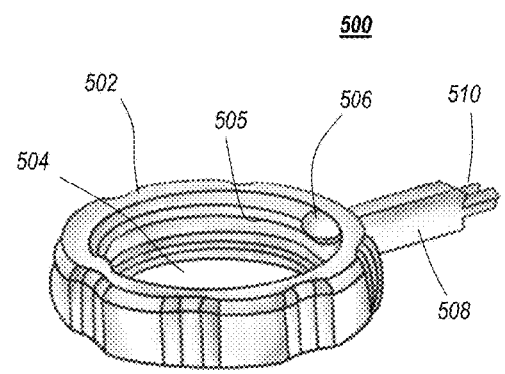
FIG. 5B shows a perspective view of the positioning ring of FIG. 5A.

FIG. 5A shows a bottom view of a positioning ring 500 having a detent feature, in accordance with some embodiments, and FIG. 5B shows a perspective view of the positioning ring 500. The positioning ring 500 includes a circular body 502 through which there is a circular opening 504 that passes through the circular body 502. There is a positive or convex detent feature 506 that protrudes into the opening 504 from an inner wall 505. The positive detent feature can be either static (immovable) or active. If the detent feature 506 is active, it is biased outward from the circular wall, such as by a spring, into the opening 504. The positioning ring 500 includes a radial extension 508 that extends from the outside of the circular body 502, and includes a clasping feature 510 at the distal end of the radial extension 508 to connect the positioning ring to hinge linkage (e.g. 108).

Figure 6:
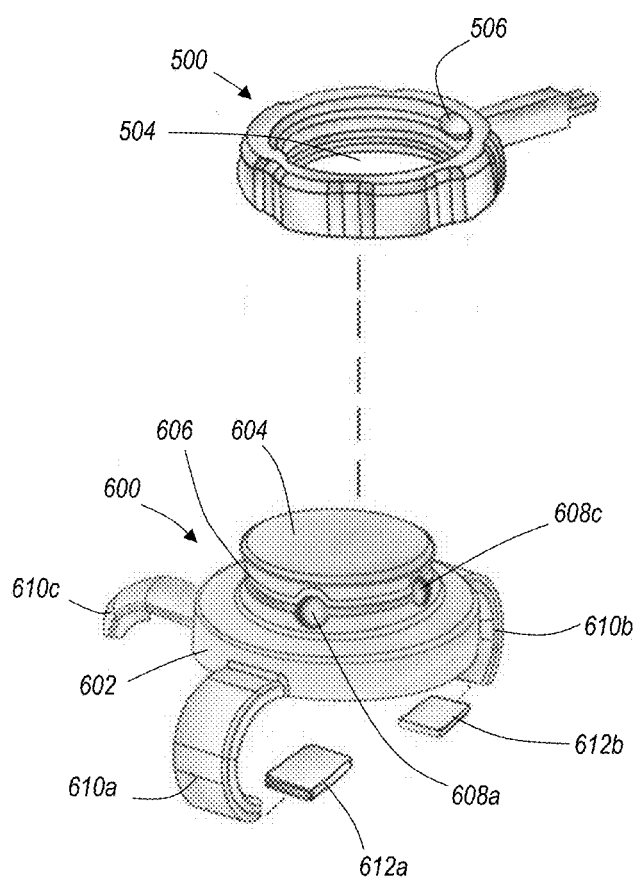
FIG. 6 shows a perspective exploded view of the positioning ring of FIG. 5A being used with a sensor holder having corresponding detent features, in accordance with some embodiments.

FIG. 6 shows a perspective exploded view of the positioning ring 500 being used with a sensor holder 600 that has corresponding detent features, in accordance with some embodiments. The sensor holder 600 includes a main body 602, and a cylindrical portion 604 that extends from the main body 602. The main body 602 is also cylindrical, and puck shaped, where the diameter of the main body is much larger than its height. The cylindrical portion 604 and the main body can share a common cylindrical axis (which is perpendicular to the radius of the cylindrical portion). The cylindrical portion 604 has a diameter that is sized to fit snugly into the opening 504 of the sensor positioning ring 500, and includes a sidewall 606 that has concave detent features 608a, 608b (see FIG. 7), and 608c. These concave detent features 608 are sized to create a mechanical interference with the detent feature 506 of the sensor positioning ring 500, which is convex. More specifically, when the sensor holder 600 is rotated to a position where the convex detent feature 506 meets one of the concave detent features 608a, 608b, or 608c, a mechanical interference between the convex detent feature 506 and the concave detent feature 608a, 608b, or 608c creates resistance to rotation of the sensor holder 600. This resistance can be overcome with a rotational force being manually applied to the sensor holder 600 relative to the positioning ring 500 that is more than the force needed to rotate the sensor holder 600 when the mechanical interference is not present (e.g. convex detent feature 506 is not in any of the concave detent features 608a-c). That is, the size of the cylindrical portion 604 is such that it can fit into the opening 504, and past the convex detent feature 506, and then rotate. When rotated, the detent feature 506 can fall into one of the concave detent features 608, which creates a mechanical interference that resists further rotation. This resistance be overcome with a small amount of rotational force applied to the sensor holder to allow the user to rotate the sensor holder to the desired position. These detent features 506, 608, define several positions of the sensor holder 600 to the sensor positioning ring 500 that are useful for holding the sensor, to prevent the sensor holder from coming out of position when used for producing a radiograph image. These positions include a position for when the system is configured in an anterior view configuration, a position for a posterior view configuration, and a position for a bite wing view configuration, as exemplified in FIGS. 2A-4B. The senor holder also includes three hook arms 610a, 610b, 610c, which each extend from the main body 602 outward, and then down (in the opposite direction from the cylindrical portion 604), and then inward, in the form of a hook. The precise shape of these hook arms 610 is intended to follow the outer surface contour of a radiograph sensor body, so as to hold the radiograph sensor body snugly between the hook arms 610, where hook arm 610c is positioned to meet an end of the sensor body and hook arms 610a,b hold the sensor body at the sides.

Figure 7:
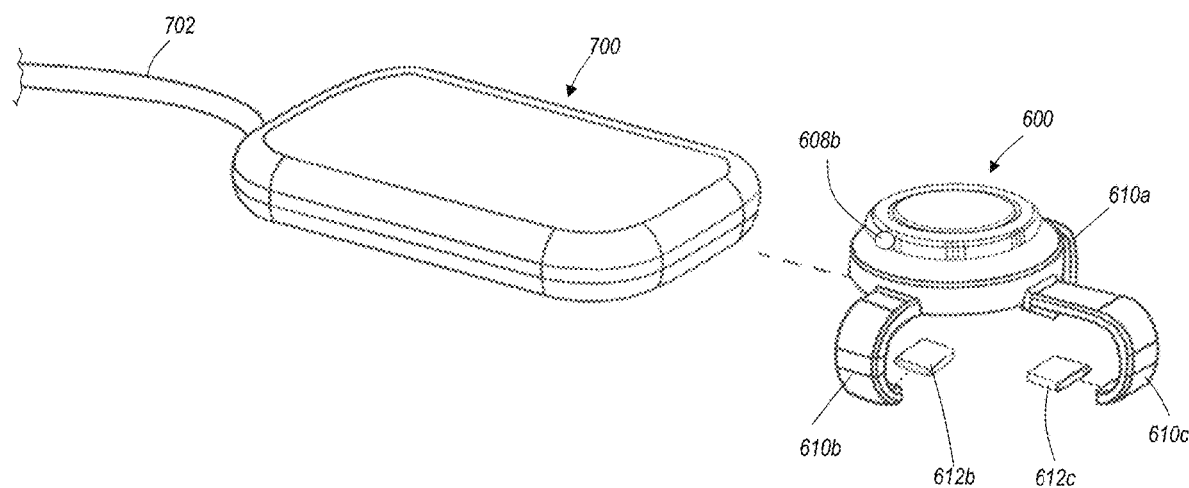
FIG. 7 shows a perspective exploded view of a sensor holder and sensor, in accordance with some embodiments.

To accommodate various sensor body sizes, flexible ends 612a, 612b, 612c (see FIG. 7 also) can be attached to the ends of the respective hook arms 610a-c. The flexible ends 612 can be sized to hold a specific sensor body size, and there can be multiple different sizes of the flexible ends that the user can select in accordance with the particular sensor being used. The flexible ends 612 can slip onto the distal ends of the hook arms 610, and can be made of a flexible material that creates more friction against the outer surface of the sensor body that the material of the sensor holder 600. In some embodiments, the flexible ends can be made of silicone, and can be sterilized in an autoclave, along with the sensor holder 600, positioning ring 500, and hinge linkage and other portions of the sensor holder and aiming structure. FIG. 7 shows a perspective exploded view of a sensor holder 600 and sensor 700, in accordance with some embodiments. The sensor holder 600 holds the sensor 700, as shown, for example, in FIGS. 2A-4B. The sensor 700 includes a housing, seen here, with either film or an electronic imaging detector inside the housing. In most cases, presently, film is no longer used and the sensor provides image data via a cable 702 to a computing system that can display the resulting image.

Figure 8A:
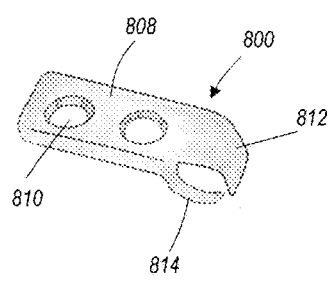
FIG. 8A shows a perspective view of an aiming ring coupler, in accordance with some embodiments.
Figure 8B:
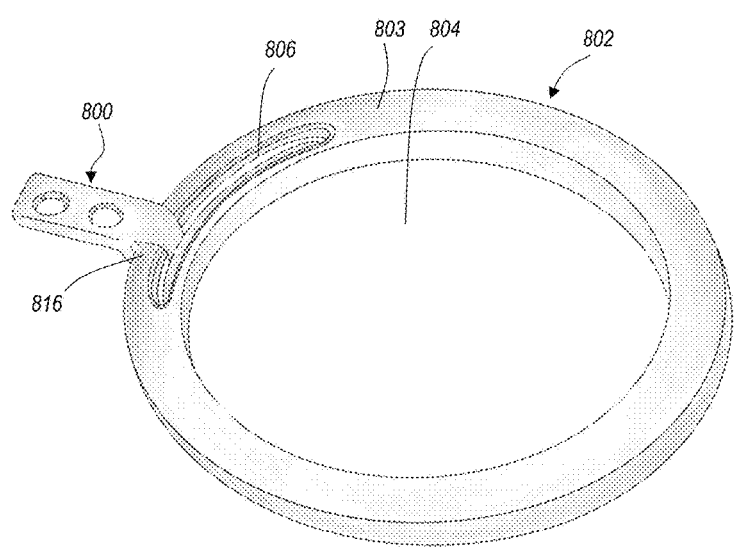
FIG. 8B shows a perspective view of the aiming ring coupler of FIG. 8A being used to couple to an aiming ring, in accordance with some embodiments.

FIG. 8A shows a perspective view of an aiming ring coupler 800, in accordance with some embodiments, and FIG. 8B shows a perspective view of the aiming ring coupler 800 of FIG. 8A being used to couple to an aiming ring 802. The coupler 800 includes a flat body portion 808 that can have one or more openings 810 to attach the coupler 800 to a hanger coupling (e.g. 118) that can be moved along a handle (e.g. 102). The coupler 800 also includes opposing coupling portions 812, 814 that extend from the flat body portion 808 and one end. Portion 812 fits into an arcuate slot 806 in the circular body 803 of an aiming ring 802, while portion 814 traverses the outside of the aiming ring 802 and to the opposite side of the aiming ring 802 to grasp the outer section 816 of the body. The arcuate slot 806 extends along the body 803 in an arc that has a length selected to allow reconfiguration of the aiming ring to accommodate the various view configurations shown in FIGS. 2A-4B. Thus, the coupler 800 can be slid from one end of the arcuate slot 806 to the other, or to positions in between to provide finer adjustment of the positioning of the sensor relative to the aiming ring 802 than is there are only two positions available. That is, the aiming ring is mounted to the long portion of the handle by a coupler (e.g. 800) that fits into the arcuate slot 806, and wherein a position of the aiming ring 802 can be adjusted by rotating the aiming ring 802 such that the coupler moves to a selected position along the arcuate slot 806. This obviates the need to disconnect the aiming ring from the handle and swap hanger blocks having different length coupling arms, as in FIGS. 1A-4B.

Figure 9A:
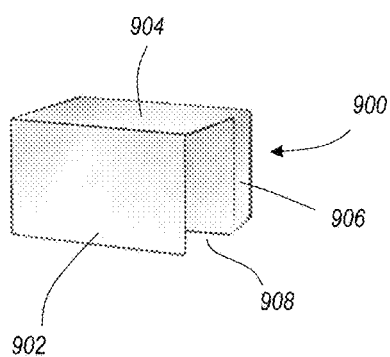
FIG. 9A shows a perspective view of a bite block height extender, in accordance with some embodiments.
Figure 9B:
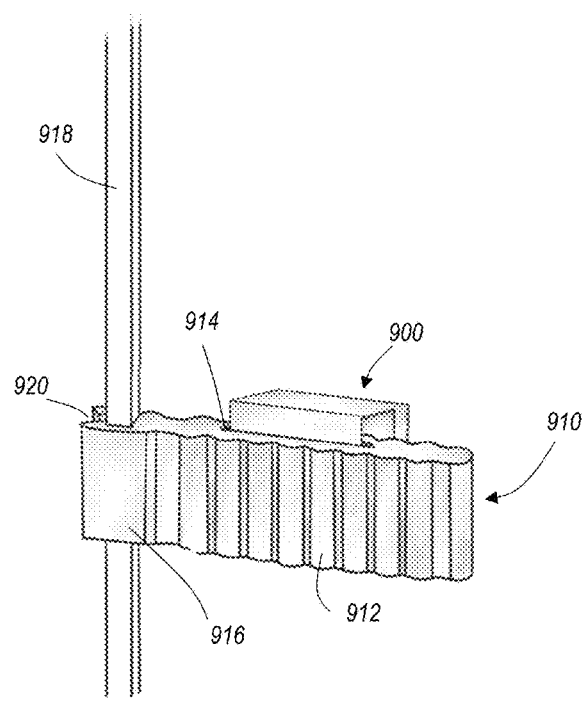
FIG. 9B shows a perspective view of the bite block height extender of FIG. 9A being used with a bite block, in accordance with some embodiments.
Figure 9C:
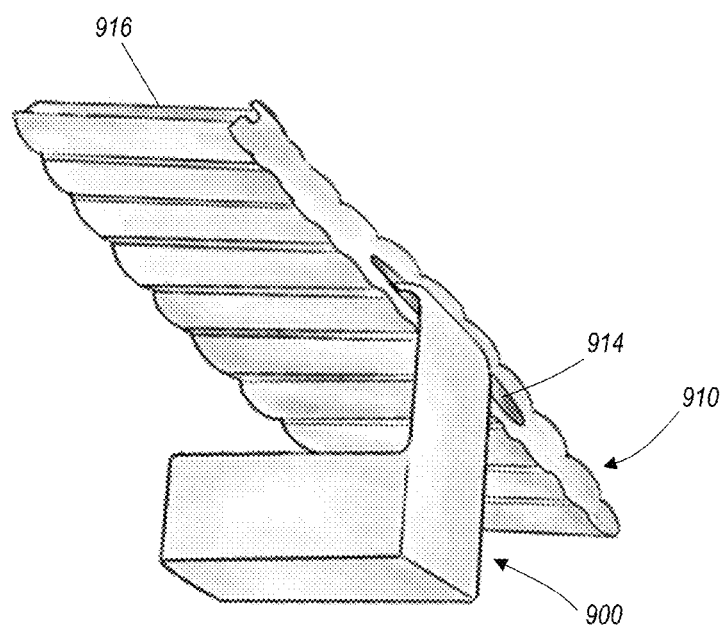
FIG. 9C shows another perspective view of a bite block having a bite block height extender coupled to the bite block, in accordance with some embodiments.

FIGS. 9A-9C shows perspective views of a bite block height extender 900 and bite block 910, in accordance with some embodiments. The bite block extender 900 includes an insert portion 902 that is remote from a main body 906. A wall 904 extends between the insert portion 902 and the main body 906, creating a space 908 between them, so as to allow the insert portion 902 to be inserted into a slot 914 in the bite block 910. The bite block 910 has a bite body 912 that patients bite down on when radiographic imaging is being performed to hold the sensor in position. The bite block includes an end portion 916 that is configured to clip onto a handle 918. The handle also supports the aiming ring and the sensor, as indicated in FIGS. 2A-4B. In particular, the end portion 916 can be formed into opposing extensions 920 that can be pushed over the handle 918 and hold onto the handle 918. The bite block 910 is made of a firm material, but does not need to be rigid so as to not be uncomfortable when placed in the mouth of a patient. As shown in FIGS. 9B-9C, the insert portion 902 of the bite block height extender 900 can be inserted into the side of the bite block 910 in slot 914. The distance between the insert portion 902 and the main body 906 allows the main body 906 to rest against the interior of the patient's oral cavity, and provide support in certain cases where use of the bite block 910 alone does not provide enough support. For example, in some cases the patient can have a short palate, or there can be an abscess in the patient's mouth that prevents use of the bite block 910 alone.

Figure 10:
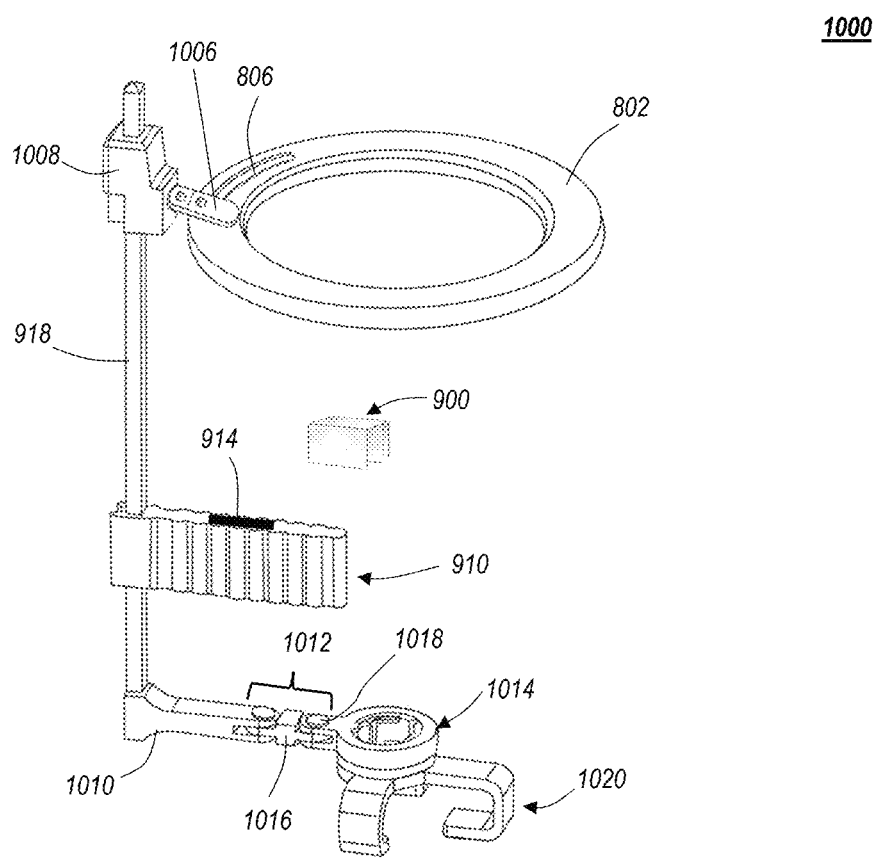
FIG. 10 shows a perspective view of a multi configurable dental radiograph sensor holder and aiming system, in accordance with some embodiments.

FIG. 10 shows a perspective view of a multi configurable dental radiograph sensor holder and aiming system 1000, in accordance with some embodiments. The system 1000 is intended to hold a radiograph imaging sensor in a patient's mouth/oral cavity in order to produce images of patent's teeth for examination by a dental professional, as shown, for example, in FIGS. 2A-4B. The system 1000 allows the positioning of the sensor to be reconfigured in order to produce images of various portions of the patent's dentition. In particular, posterior, anterior and bite wing images can be produced by reconfiguring the system, as indicted in FIGS. 2A-4B. That is, the system 1000 is a slight alternative to that shown in FIGS. 2A-4B to accomplish the same results and collect the same images as would be collected using the configurations of FIGS. 2A-4B. Accordingly, there is an aiming ring 802 that include an arcuate slot 806. The aiming ring is intended to allow alignment of a radiographic source that is incident on the sensor to produce the desired image, as is well known. The aiming ring is coupled rigidly to a handle 918 by a coupler 1006 and hanger coupling 1008. The coupler 1006 can couple to the aiming ring anywhere along the slot 806, and the hanger coupling 1008 can be moved along the shaft of the handle 918 as needed for a given patient. A bite block 910 is also coupled to the handle 918 to allow the patient to bite down on the bite block and hold the system 1000 in place to produce an image. In some cases, for some patients, a bite block height extender 900 may be used to provide additional support for the system 1000. The bite block 910 can also be moved along the shaft of the handle 918 to suit the particular dimension of a given patient's oral cavity. The handle can have a short portion 1010 that extends at a right angle, generally, giving the handle 918 an overall "L" shape. The short portion 1010 connects, though a hinge linkage 1012, to a sensor positioning ring 1014, which is in turn coupled to a sensor holder 1020. The hinge linkage 1012 includes an intermediate portion 1016 that is coupled to the short portion 1010 at one end, and the radial extension of the positioning ring 1014, via hinge pins 1018. Thus, the hinge linkage 1012 works in the same manner as hinge linkage 108 of FIG. 1C. Between the hinge linkage and the adjustable coupling to the aiming ring, the system 1000 can be configured to any of the configurations shown in FIGS. 2A-4B to collect anterior, posterior, and bite wing images.

Figure 11:
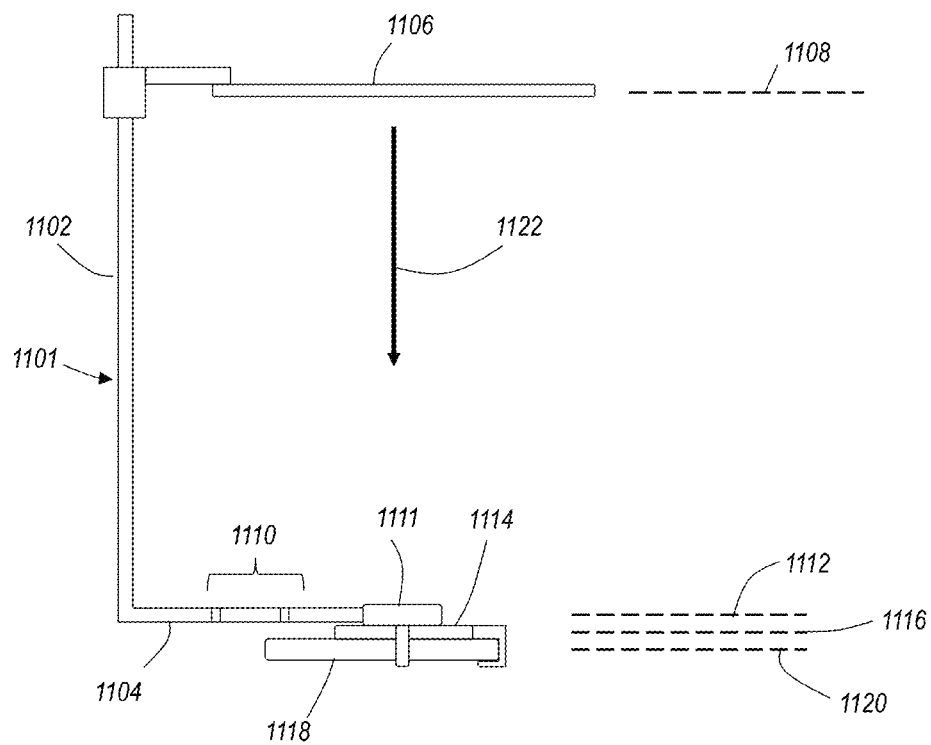
FIG. 11 shows a plan side view of a multi-configurable dental radiograph holder system, in accordance with some embodiments.

FIG. 11 shows a plan side view of a multi-configurable dental radiograph holder system 1100, in accordance with some embodiments. A handle includes a long portion 1102, and a short portion 1104 at right angles to each other. An aiming ring 1106 is mounted or coupled to the long portion 1102 of the handle 1101. The aiming ring is generally flat and circular within an aiming ring plane 1108. A hinge linkage 1110 couples the short portion 1104 of the handle to a positioning ring 1111, and the hinge linkage is articulable in a hinge plane 1112 that is parallel to the aiming ring plane 1108. The hinge linkage 1110 has at least two hinge points. In some embodiments the hinge linkage is designed to limit articulation to a single plane, so that the positioning ring 1111 can only be moved in one plane. A sensor holder 1114 is rotatably coupled to the positioning ring 1111, and is rotatable in a holder plane 1116, which is also parallel to the aiming ring plane 1108. This holds the sensor 1118 oriented in a sensor plane 1120 that is also parallel to the aiming ring plane. Thus, radiation is aimed through aiming ring, from a source, in the direction of arrow 1122, which is perpendicular to the aiming ring plane 1108, and the other planes 1112, 1116, 1120, and is incident on the sensor 1118 to produce an image. The sensor 1118 is positioned in the oral cavity of the patient, and the aiming ring 1106 is outside of the patient, adjacent the patient's face. Thus, by aligning the source perpendicular to the aiming ring plane, and centered on the aiming ring, the source will be properly aimed at the sensor, even though the user cannot see the senor in the patient's mouth.

The disclosed multi-configurable dental radiograph sensor holder system eliminates the need for multiple separate sensor holder attachments for each of the various views commonly taken by dental professionals. Using the inventive multi-configurable dental radiograph sensor holder system, a dental professional can simply reconfigure portions of the system by, for example, rotating the sensor holder relative to the positioning ring, articulate the hinge linkage, and adjust the aiming ring coupling for the desired view. Anterior, posterior, and bite wing views can all be taken with the same structure by simply adjusting the positions of the sensor holder, hinge linkage, and aiming ring without having to have an entire kit of various attachments for each of the different views. This greatly simplifies the process of collecting dental images, as well as the process of autoclaving or otherwise sterilizing the components of the radiograph sensor holder.

The claims appended hereto are meant to cover all modifications and changes within the scope and spirit of the present invention.

What is claimed is:

1. A multi-configurable dental radiograph sensor holder system, comprising:
   a handle having a long portion and a short portion;
   an aiming ring mounted to the long portion of the handle and defining an aiming ring plane; and
   a hinge linkage coupled to the short portion that is articulable in a hinge plane that is parallel to the aiming ring plane, the hinge linkage including an intermediate portion that is hingeably coupled to the short portion of the handle, and a first hinge pin disposed between a distal end of the short portion of the handle and a first end of the intermediate portion, wherein both the distal end of the short portion of the handle and the first end of the intermediate portion are coupled to the first hinge pin.

2. The multi-configurable dental radiograph sensor holder system as claimed in claim 1, further comprising:

a positioning ring coupled to the hinge linkage; and
a sensor holder rotatably coupled to the positioning ring, wherein the sensor holder is rotatable about the coupling to the positioning ring in a plane that is parallel to the aiming ring plane.

3. The multi-configurable dental radiograph sensor holder system as claimed in claim 2, wherein the positioning ring includes a circular opening, and the sensor holder includes a cylindrical portion sized to fit into the circular opening of the positioning ring.

4. The multi-configurable dental radiograph sensor holder system as claimed in claim 3, further comprising a convex detent feature provided on an inner wall of a circular body of the positioning ring through which the circular opening passes such that the convex detent feature extends into the circular opening, and wherein the cylindrical portion of the sensor holder includes three concave detent features on a sidewall of the cylindrical portion, and wherein when the sensor holder is rotated to a position where the convex detent feature meets one of the concave detent features, a mechanical interference between the convex detent feature and the concave detent feature creates resistance to rotation of the sensor holder.

5. The multi-configurable dental radiograph sensor holder system as claimed in claim 1, further including a positioning ring having a radial extension, the radial extension having a distal end, a second hinge pin disposed between the distal end of the radial extension of the positioning ring and a second end of the intermediate portion that is opposite the first end of the intermediate portion, wherein both the second end of the intermediate portion and the distal end of the radial extension are clasped to the second hinge pin.

6. The multi-configurable dental radiograph sensor holder system as claimed in claim 1, wherein the hinge linkage is articulable between an anterior view configuration, a posterior view configuration, and a bite wing view configuration.

7. A multi-configurable dental radiograph sensor holder system, comprising:
a handle having a long portion and a short portion;
an aiming ring mounted to the long portion of the handle and defining an aiming ring plane;
a hinge linkage coupled, at a first hinge point, to the short portion of the handle;
a positioning ring coupled to the hinge linkage at a second hinge point;
a sensor holder rotatably coupled to the positioning ring, wherein the sensor holder is rotatable about the coupling to the positioning ring in a plane that is parallel to the aiming ring plane;
wherein the sensor holder, positioning ring, and the hinge linkage can be configured into an anterior view configuration, a posterior view configuration, and a bite wing view configuration without removing the sensor holder or positioning ring, wherein the positioning ring includes a circular opening, and the sensor holder includes a cylindrical portion sized to fit into the circular opening of the positioning ring; and
a convex detent feature provided on an inner wall of a circular body of the positioning ring through which the circular opening passes such that the convex detent feature extends into the circular opening, and wherein the cylindrical portion of the sensor holder includes three concave detent features on a sidewall of the cylindrical portion, and wherein when the sensor holder is rotated to a position where the convex detent feature meets one of the concave detent features, a mechanical interference between the convex detent feature and the concave detent feature creates resistance to rotation of the sensor holder.

8. The multi-configurable dental radiograph sensor holder system as claimed in claim 7, wherein the hinge linkage is restricted to articulation in a plane that is parallel to the aiming ring plane.

9. The multi-configurable dental radiograph sensor holder system as claimed in claim 7, wherein rotation of the sensor holder is restricted to rotation in a plane that is parallel to the aiming ring plane.

10. The multi-configurable dental radiograph sensor holder system as claimed in claim 7, wherein in the aiming ring includes an arcuate slot, and wherein the aiming ring is mounted to the long portion of the handle by a coupler that fits into the arcuate slot, and wherein a position of the aiming ring can be adjust by rotating the aiming ring such that the coupler move to a selected position along the arcuate slot.

11. The multi-configurable dental radiograph sensor holder system as claimed in claim 7, wherein the hinge linkage comprises: an intermediate portion that is hingeably coupled to the short portion of the handle.

12. The multi-configurable dental radiograph sensor holder system as claimed in claim 11, further comprising a first hinge pin disposed between a distal end of the short portion of the handle and a first end of the intermediate portion, wherein both the distal end of the short portion of the handle and the first end of the intermediate portion are clasped to the first hinge pin.

13. The multi-configurable dental radiograph sensor holder system as claimed in claim 12, further including a positioning ring having a radial extension, the radial extension having a distal end, a second hinge pin disposed between the distal end of the radial extension of the positioning ring and a second end of the intermediate portion that is opposite the first end of the intermediate portion, wherein both the second end of the intermediate portion and the distal end of the radial extension are clasped to the second hinge pin.

14. The multi-configurable dental radiograph sensor holder system as claimed in claim 7, wherein the hinge linkage is articulable between an anterior view configuration, a posterior view configuration, and a bite wing view configuration.

* * * * *